W. D. ADDISON.
TIRE CHAIN CONNECTOR.
APPLICATION FILED JULY 11, 1919.
1,360,859. Patented Nov. 30, 1920.
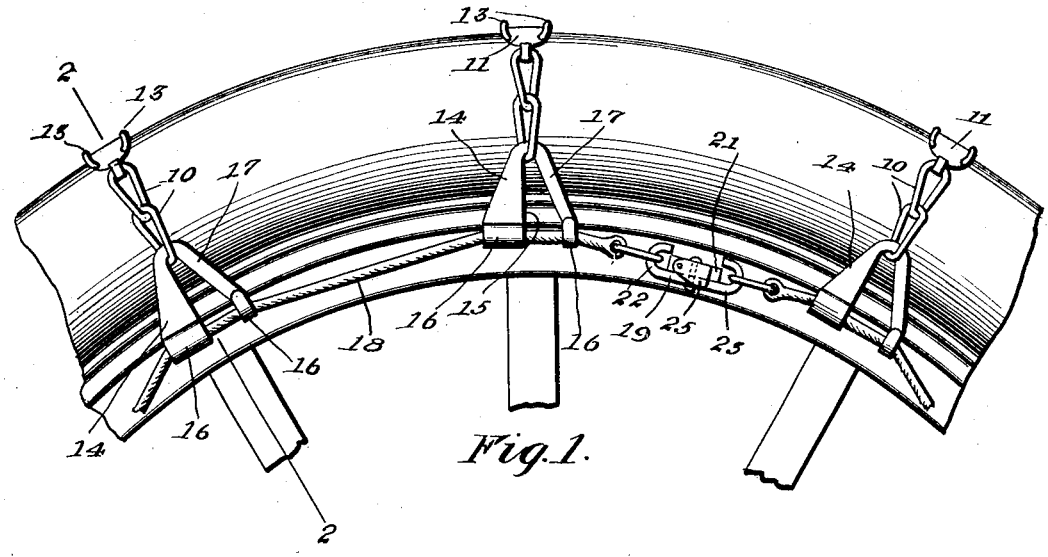
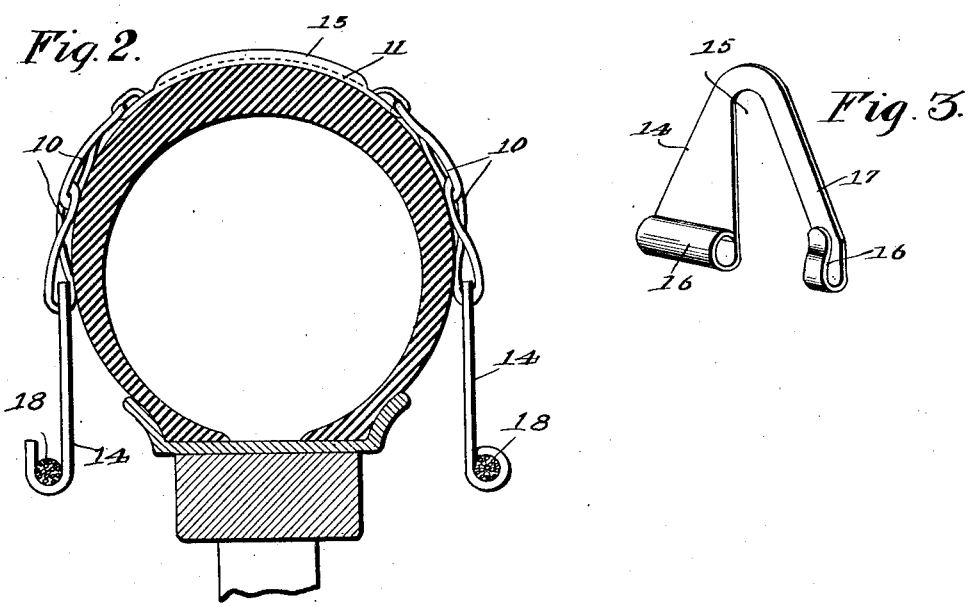
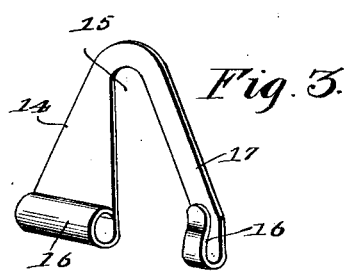
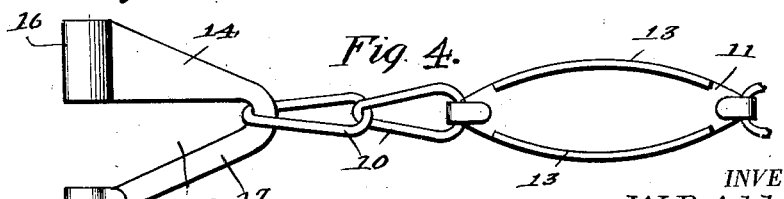
WITNESSES
N. A. Thomas
INVENTOR.
BY W. D. Addison
Victor J. Evans
ATTORNEY.

UNITED STATES PATENT OFFICE.

WILLIAM D. ADDISON, OF MANNING, IOWA.

TIRE-CHAIN CONNECTOR.

1,360,859.   Specification of Letters Patent.   Patented Nov. 30, 1920.

Application filed July 11, 1919. Serial No. 309,992.

*To all whom it may concern:*

Be it known that I, WILLIAM D. ADDISON, a citizen of the United States, residing at Manning, in the county of Carroll and State of Iowa, have invented new and useful Improvements in Tire-Chain Connectors, of which the following is a specification.

This invention relates to skid chains and comprehends certain improvements over the structure disclosed in my Patent Number 1,295,669 issued February 25th, 1919.

The present invention aims to provide a novel construction of a connector for associating the terminals of the cross chains with the retaining cables arranged at the opposite sides of the wheel, the connector being designed to effectively engage the retaining cables in a manner to maintain the cross chains taut across the tread of the tire.

The nature and advantages of the invention will be better understood, when the following detailed description is read in connection with the accompanying drawings, the invention residing in the construction, combination and arrangement of parts as claimed.

In the drawings forming part of this specification like numerals of reference indicate similar parts in the several views, and wherein:—

Figure 1 is a side elevation of a portion of a wheel showing my chain applied thereto, Fig. 2 is a transverse sectional view taken on the line 2—2 of Fig. 1.

Fig. 3 is a detail view of one of the coupling members for the cross chains.

Fig. 4 is a fragmentary plan view of one of the cross chains.

The cross chains are connected to the retaining cables by means of the couplings of the type disclosed in Fig. 3. Each coupling consists of a substantially triangular shaped plate 14 slotted as at 15, the slot being substantially of the same outline as the plate and disposed to provide a relatively narrow portion 17. This construction allows the end link of the cross chains to be quickly and easily associated with the plate 14, by passing the reduced portion 17 through the link as shown. The side of the plate 14 opposite the apex thereof is formed with hook like portions 16 adapted to engage the retaining cables as shown. The hook 16 of the narrow portion 17 of the plate is always left open for the quick repair of cross chains, while the hook 16 of the wide portion of the plate is closed tightly around the cables which provides for an effective means for retaining the cables in position and holding their cross chains taut.

While I have shown and described what I consider the preferred embodiment of the invention, I desire to have it understood that I do not limit myself to the exact construction and arrangement of parts illustrated and that such changes may be resorted to when desired as fall within the scope of what is claimed.

What I claim is:—

1. A connector of the character described comprising a triangular shaped plate slotted to divide the plate into unequal portions and attaching means carried by the free ends of each portion.

2. A connector of the character described comprising a triangular shaped plate slotted to divide the plate into unequal portions and the free edge of each portion terminating to provide hook like members arranged at one side of the plate.

3. A connector of the character described comprising a triangular shaped plate slotted to divide the plate into unequal portions, spaced hook like members formed on one edge of the plate and arranged in spaced relation, one of said hook like portions being closed and the other being opened for the purpose specified.

In testimony whereof I affix my signature.

WILLIAM D. ADDISON.